US008578395B2

(12) United States Patent
Holmes et al.

(10) Patent No.: US 8,578,395 B2
(45) Date of Patent: *Nov. 5, 2013

(54) COMMON COMPONENT FRAMEWORK

(75) Inventors: Raymond Douglas Holmes, Forest Hills, NY (US); Kwok Ping Leung, Bukit Batok Central (SG); Mike Tyldesley, Singapore (SG); Adrian Chua Tze Hou, Singapore (SG); Nicholas Kolba, New York, NY (US)

(73) Assignee: Reuters America, LLC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/870,018

(22) Filed: Aug. 27, 2010

(65) Prior Publication Data

US 2010/0325641 A1    Dec. 23, 2010

Related U.S. Application Data

(63) Continuation of application No. 11/533,900, filed on Sep. 21, 2006, now Pat. No. 7,805,730.

(51) Int. Cl.
*G06F 3/00*   (2006.01)
*G06F 9/44*   (2006.01)
*G06F 9/46*   (2006.01)
*G06F 13/00*  (2006.01)

(52) U.S. Cl.
USPC ............................. 719/316; 719/313; 719/315

(58) Field of Classification Search
USPC ........................... 719/313, 315, 316
See application file for complete search history.

(56) References Cited

U.S. PATENT DOCUMENTS

| | | | |
|---|---|---|---|
| 6,061,695 A * | 5/2000 | Slivka et al. | 715/203 |
| 6,412,020 B1 | 6/2002 | Leach et al. | |
| 6,594,692 B1 | 7/2003 | Reisman | |
| 6,694,513 B1 | 2/2004 | Andersson | |
| 7,003,773 B2 * | 2/2006 | Hoennig et al. | 719/311 |
| 7,500,248 B2 | 3/2009 | Srinivas | |
| 2002/0191013 A1 | 12/2002 | Abrams | |
| 2006/0111936 A1 * | 5/2006 | Mahesh et al. | 705/2 |
| 2008/0133510 A1 | 6/2008 | Timmons | |
| 2008/0270577 A1 | 10/2008 | Walrath | |

OTHER PUBLICATIONS

Najmi, Component Object Model (COM) and its Related COM-Based Technologies, Techi Warehouse, Aug. 13, 2004, pp. 1-3.
Sevilla et al, Design and Implementation of a Grid-Enabled Component Container for Corba Lightweight Components, Springer-Verlag Berlin Heidelberg, 2004, pp. 1-8.

(Continued)

*Primary Examiner* — Diem Cao
(74) *Attorney, Agent, or Firm* — Banner & Witcoff, Ltd.

(57) ABSTRACT

A Common Component Framework (CCF) provides a container interface and a component interface for communication in a multi-tiered software application. Component context data may be transmitted to and from a container describing a current state of a component executing within the container. Context data may correspond to a specific entity (e.g., a financial entity such as a company or stock) identified by a user interacting with the component. The container may communicate the context data between different components to synchronize and coordinate component behavior, providing a more robust and coherent user experience. In addition to component context data, other information may be transmitted between containers and components such as properties, menu options, and data fields, supporting more complete integration of even web-based components into containers.

8 Claims, 9 Drawing Sheets

(56) References Cited

OTHER PUBLICATIONS

Bernholdt, et al., A Component Architecture for High-Performance Scientific Computing, Intl. J. High Performance Computing Applications ACTS Collection Special Issue, May 2006, pp. 1-79.
Onion, "Control Containment in ATL", XP002471329 (Jul. 1999).
EP Office Action dated Feb. 2, 2012 in corresponding Application No. 07 838 640.6.
Onion F: "VC++MFC ActiveX Control Article, COM Drag—DRop Example", Internet citaion, Apr. 1999, pp. 1-7, retrieved from Internet: URL:http://www.ucancode.net/Visual_C_Control/MFC-ActiveX-Control-Com-Article-Drag-Drop-Example.htm (retrieved on Jan. 26, 2012].
JP Office Action dated Mar. 13, 2012 in corresponding Application No. 2009-529252; English Translation.
David Platt, "The Free Threading Model is What's Hot This Fall", MSJ (Microsoft Systems Journal, Japanese Edition), No. 51, ASCII Corporation, Oct. 18, 1997, p. 72-86, ISBN: 4-7561-1443-1.
Brent Rector, et al., "Write ActiveX Controls Using Custom Interfaces Provided by ATL 3.0, Part I," MSJ (Microsoft Systems Journal, Japanese Edition), No. 60, ASCII Corporation, Mar. 18, 1999, p. 71-84, ISBN: 4-7561-3053-4.
Microsoft Interactive Developer (Japanese Edition), Sep. 1997 No. 3, p. 71-91 "Making your control containers internet-aware with active X and OLE controls 96" by Michael T. McKeown; Partial Translation.
Web Designing vol. 6, No. 6 of Jun. 1, 2001 published in Japan by Mainichi Communications, p. 110-112 "Firefox extension catalog for web designing Series #3"; Partial Translation.
Japanese Patent Disclosure H9-510567 (corresponding to WO 95/25999) Partial Translation.
Nikkei Mac, Jan. 1998 published in Japan Dec. 18, 1997, p. 250-255, "No. 9 Copy-Paste and Drag-Drop"; Partial Translation.
DDJ (Dr. Dobb's Journal) (Japanese Edition), Feb. 1997 published Feb. 1 ,Undocumented Corner, p. 93-99 "OLE Drag & Drop by MFC's Implementation"; Partial Translation.
JP Notice of Reasons for Rejection dated Oct. 16, 2012 in corresponding JP Application No. 2009-529252. English Translation.

* cited by examiner

COMMON COMPONENT FRAMEWORK

CROSS-REFERENCE TO RELATED APPLICATIONS

This application is continuation of and claims the benefit of priority from co-pending U.S. application Ser. No. 11/533,900, entitled "COMMON COMPONENT FRAMEWORK," filed on Sep. 21, 2006, the content of which is incorporated herein by reference.

FIELD OF THE INVENTION

This invention relates generally to methods of communication between objects in a software application. More particularly, the present invention relates to a generic communication framework established between a container application and component software objects within the container.

BACKGROUND

Software applications are commonly implemented as multi-tier applications based on modular components executing within a software container application. These container-component applications provide advantages in development, portability, and scalability. Container applications can handle transactions, security, and component management functions, allowing component developers to focus on the specific functionality implemented by their component. Additionally, containers can coordinate between multiple components and synchronize behaviors by communicating concurrently with each of its components.

Before these advantages can be realized, an effective communication standard must be established between container application and its components. This can be a challenge, since both components and containers may be any one of a number of different object types. For example, a component may be implemented as a simple HTML page, a web-based object, or an instance of an application object. For any web-based component, the container might be another web page, or a desktop container application. One previous solution for the communication difficulties involves the use of containers with native components. When a desktop container application includes native components designed specifically for use within that container, these so-called "smart" components can be tightly integrated into the container environment. For example, a smart component could be placed directly into a flex sheet of a container instance (e.g., as a tile or tab in the container window), rather than started in a separate pop-up window. Similarly, the component can support more robust functionality and can be fully integrated into the container's flex paradigm.

However, web-based components cannot be tightly integrated into containers like native smart components. Thus, web-based components in typical container architectures often support limited functionality and provide a less coherent user experience. Additionally, as mentioned above, native smart components running within a container must often be designed specifically for the particular container application. As a result, smart components are often not operable within other containers, negating many of the primary advantages of a container-component software application.

Accordingly, there remains a need for a system of communication between a container and component in a multi-tiered software application.

SUMMARY

In light of the aforementioned problems, the invention pertains to a Common Component Framework (CCF) system for communication between container and component software objects in a multi-tier software application. In one aspect, a component invokes a registration function call on the container. Using this function, the container and component may exchange CCF interface pointers used to execute generic function calls and data requests on the other. In certain embodiments, since this exchange of interface pointers may occur near the instantiation of the component, a second function call may be used somewhat after the registration function to signal that the component is ready to receive calls and data requests from the container. Once these interfaces are established by a container and component, either side may notify the other of a user action taking place within its scope, or some other state change, allowing the notified container or component to take appropriate action to coordinate its behavior based on the change.

According to another aspect, after the CCF interface pointers have been exchanged, a user may cause a context change in a component, for example, by clicking or selecting a user interface control in the component. As an example, the context change might correspond to selection of a financial entity (e.g., company, stock, bond, market, etc.) in a component that supplies financial data or news and analysis. In response to the context change, the component may send an event to notify the container of the change and provide the new context. The container may convert the context data, if necessary, and forward the new context data to one or more other components running within the container. Thus, even components that were separately designed and developed to provide different functionality can be coordinated and synchronized by the container through the CCF interfaces, providing the user with a more seamless and coherent experience.

According to yet another aspect, the context change may result from a user drag-and-drop operation of one user interface control in the component into another component running in the same container. Drag-and-drop support between components may allow a user to drag a context into a specific component of the user's choosing, or may even permit a user to drag specific data fields from the user interface of one component into another. As an example of this functionality, search results returned by a financial data retrieval component may be dragged into a nearby spreadsheet component (e.g., a Microsoft Excel object instance) running within the same container.

These aspects as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

As the present invention relates to software object communication, a suitable general purpose computing system environment will initially be described. The computer 100, on which one or more illustrative aspects may be implemented, is only one example of a suitable computing environment and is not intended to suggest any limitation as to the scope of use or functionality of features described herein.

Illustrative Computing Environment

Figure 1:
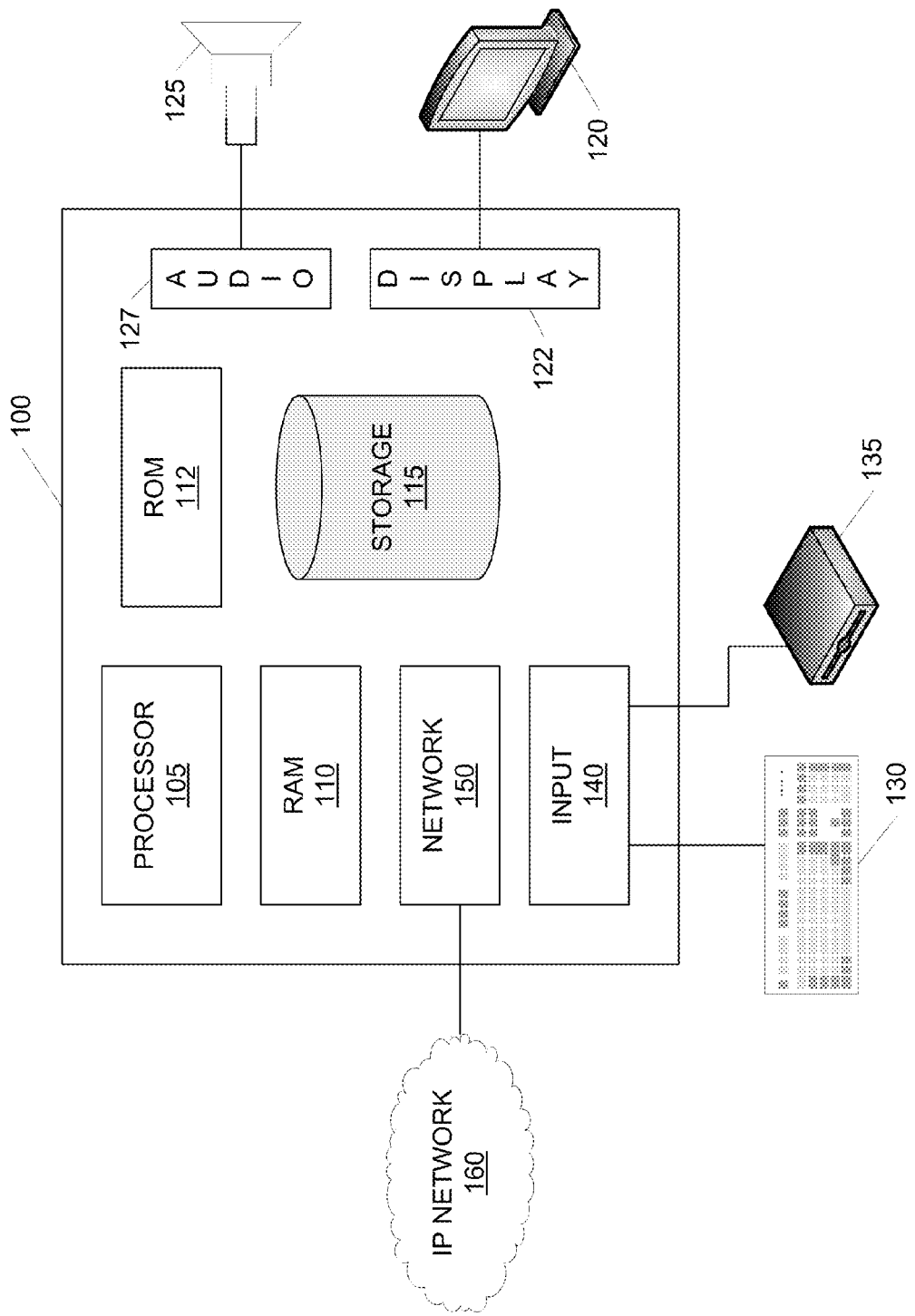
FIG. 1 illustrates a block diagram of a computing environment in accordance with aspects of the present disclosure.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In one or more instances, a device such as media drive 135 may act as both an input and output device allowing users to both write and read data to and from the storage media (e.g., DVD-R, CD-RW, etc.).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network 160 (e.g. LAN, WAN, or Internet). In one example, adapter 150 may facilitate transmission of data such as electronic mail messages and/or financial data over a company or organization's network 160. In another example, adapter 150 may facilitate transmission or receipt of information from a world wide network such as the Internet 160. Adapter 150 may include one or more sets of instructions relating to one or more networking protocols. For example adapter 150 may include a first set of instructions for processing IP network packets as well as a second set of instruction associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Illustrative Aspects

Before describing the software architecture and interface details of the Common Component Framework (CCF), an initial description will be given. The CCF is an interface that may be used for standardizing communication between one or more web-based software components, and a container associated with those components. The web-based component may be, for example, a simple HTML web page, or a more complex web-based object, such as an Active X object or Java Applet. The container could also be a web page or web-based parent object, but may instead be a desktop software application running on computer 100. As an example, the Reuter's Xtra desktop software application may be implemented to function as a CCF-enabled container. One potential advantage of a desktop application CCF container relates to enabling HTML components to exhibit behaviors similar to those of native components imbedded within the desktop container. These native, so-called "smart" components are typically defined by the container application, and therefore container often application specific.

Figure 2:
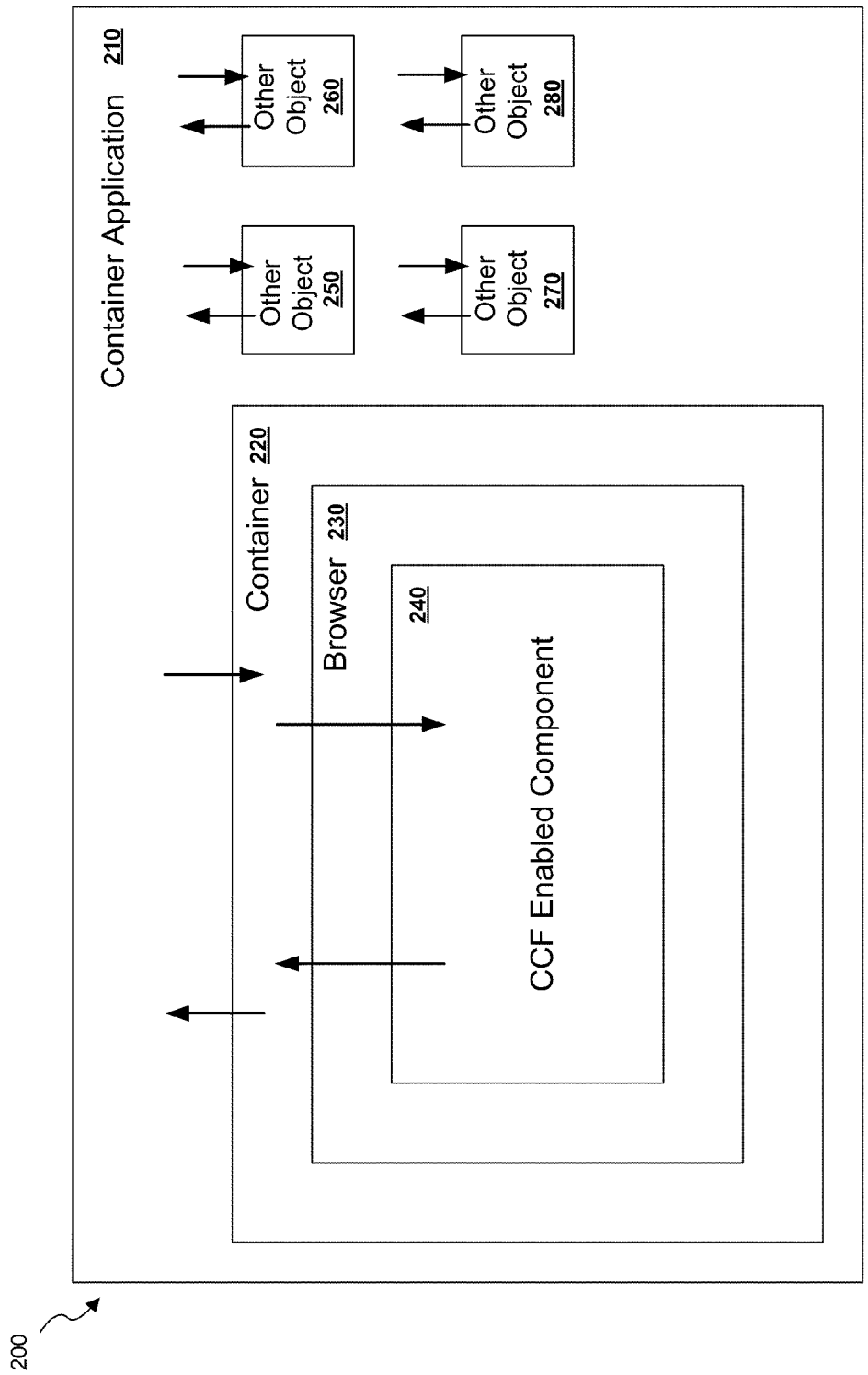
FIG. 2 illustrates a block diagram of a software component architecture, in accordance with aspects of the present disclosure.

Referring to FIG. 2, an illustrative block diagram of a software component architecture. In FIG. 2, a single instance of a container application 210 may house many different components, including one or more CCF-enabled components (e.g., component 240), as well as non-CCF components (other objects 250-280). As mentioned above, the other objects 250-280 may be native, container-specific components, designed to provide specific functionality within the container. The container 220 in this example may be a client application object, running within the container application 210, which implements the container side of the CCF interface. The container 220 may communicate with the container application 210 using the same or a similar manner as all the other components 250-280 housed by the application 210.

A web-based CCF component 240 in communication with a container 220 may run inside an instance of an Internet browser application 230, such as the Microsoft Internet Explorer (IE) browser. Of course, other browser applications may be used instead. The browser 230 in this example is an embedded copy of an IE embeddable object. As described in detail below, since the component 240 communicates directly with the CCF container 220, the component 240 need not be dependent on any particular brand or configuration of browser 230.

It should be noted that if a container 220 houses multiple CCF components 240, it may need additional dedicated storage and logic for coordinating its communications with multiple components 240 at the same time. One way of accomplishing this coordination is by maintaining a separate instance of the CCF interface for each contained component 240.

In a slightly different configuration from the one shown in FIG. 2, multiple CCF components, like component 240, may run within the same browser object 230. In such a configuration, the parent web page running in the browser 230 may present itself to the container 220 as a single component, while also supporting the container side of the CCF interface so that it may present itself as a container to the multiple internal CCF components 240. The objects and data passed between the container and components may be native objects and data of a JavaScript interpreter implemented by the browser 230. For example, in an Internet Explorer browser, IE automatically transforms IDispatch objects and VARIANTS to and from native JavaScript types. Thus, CCF components may be implemented to leverage this browser functionality.

As mentioned above, the component 240 need not be dependent on any particular brand or configuration of browser 230. However, in one configuration, the CCF container 220 interface might assume that the component 240 resides within an instance of a Microsoft Internet Explorer browser, and more specifically, an instance of an IE COM embeddable object. In this example, the CCF components 240 may access the Internet Explorer specific object "window.external" to locate the container 220. However, if a component 240 cannot access this object, it might conclude that it does not have a "window.external" container 220, and may then attempt to locate a browser (e.g., HTML) container 220. To locate a browser container 220, the component 240 may search for a global JavaScript function indicating that it does have a browser container 220. Alternatively, the component 240 may attempt to access a browser container 220 first, before attempting to access a "windows.external" container 220. Of course, CCF communication is possible between containers 220 and components 240 using other techniques for locating and accessing a container or component, as long as there is at least some communication pathway between the two. If a component 240 fails to establish communication with a container 220, it may nevertheless continue to run, although certain components may provide reduced functionality, depending on the type and implementation of the component 240.

The CCF interface might also be configured so that only COM objects are passed between the container 220 and component 240, using commonly known techniques. These COM objects may implement the IDispatch interface, and pass data of the VARIANT data type. It should be noted that while the "windows.external" interface may require this COM/IDispatch communication, other communication methods might not. For example, a browser container 220 may use native JavaScript objects and functions to implement the interface.

Figure 3:
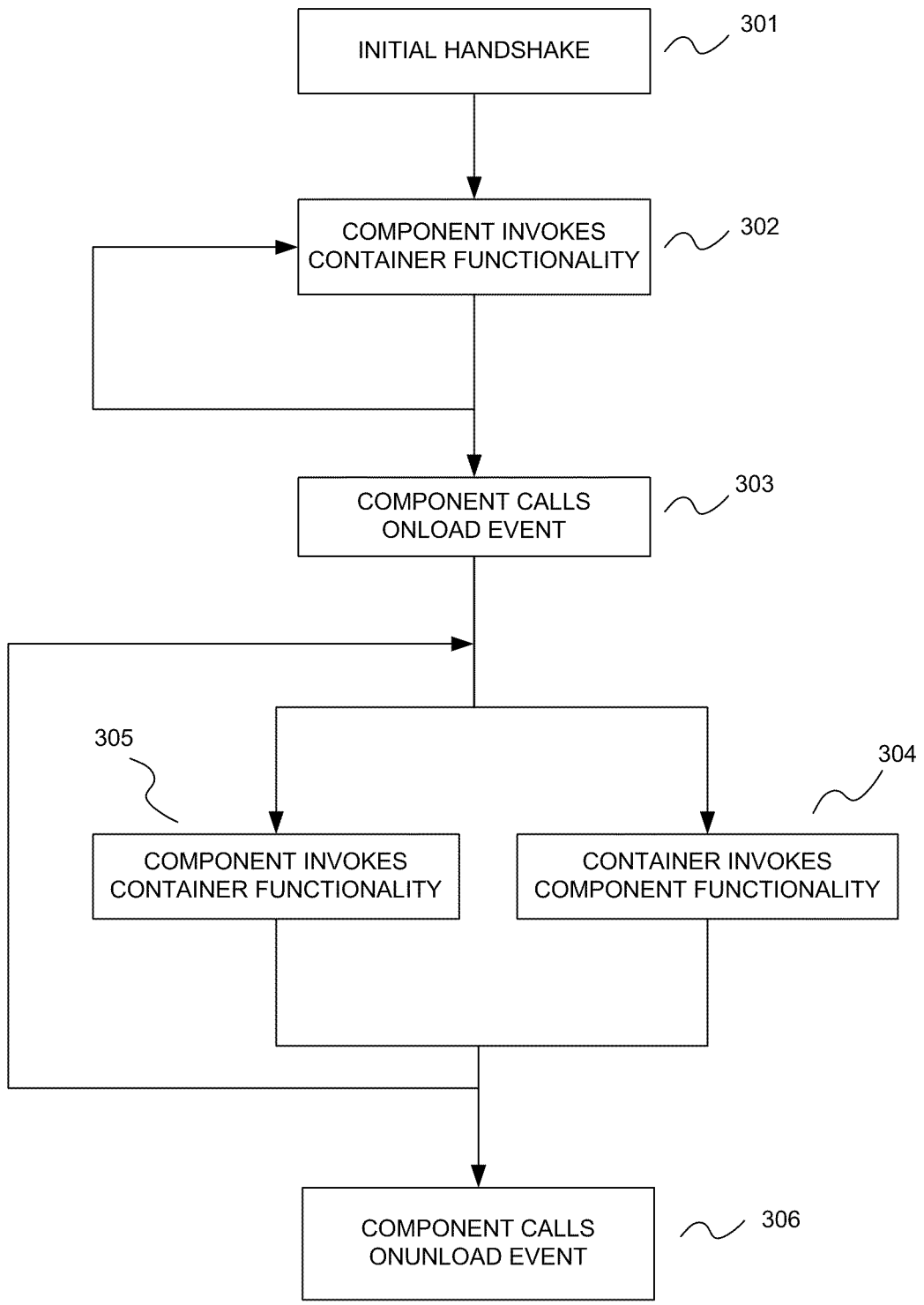
FIG. 3 is a flow diagram illustrating communication between a component and a container, in accordance with aspects of the present disclosure.

Referring to FIG. 3, a flow diagram is shown illustrating steps of communication between a container 220 and a component 240. In step 301, the component 240 initiates a registration function, or so-called handshaking function, with the container 220. An example of a possible handshaking function definition is shown below:

```
[id(1)] HRESULT registerWithCCFContainer(
    [in] ICCF* componentInterface,
    [in] BSTR componentSessionXML,
    [out, retval] ICCF** containerInterface)
```

In this example, the function is invoked on the CCF container 220 by a new component 240. A non-null value returned to the component 240 indicates that the handshaking process was successful. Additionally, if the container 220 runs within a web-based object (e.g., an HTML container running in an IE browser as shown in FIG. 2), then the registerWithCCFContainer handshaking function may be global within the browser. However, if the container 220 does not run with a browser object, then the registerWithCCFContainer function may instead be implemented using windows.external.registerWithCCFContainer.

As is shown above, the registerWithCCFContainer function allows the CCF-enabled component 240 calling the function and the CCF-enabled container 220 receiving the call to exchange interface pointers. Additionally, while processing this handshaking function, the container 220 may determine the CCF version running on the component 240, for example, by parsing the componentSessionXML parameter. In certain implementations, the version number may consist of three separate parts (e.g., numbers) separated by periods. For example, the container 220 might parse the componentSessionXML parameter to determine a component 240 is running CCF interface version "3.4.5". In this example, the first number ("3") represents a major version that will only change when a new CCF implementation is incompatible with previous versions. The second number ("4") represents a minor version indicating a backwards-compatible change in the CCF implementation from previous versions. The third number ("5") is used to reflect implementation changes that do not alter the CCF interface itself, but may fix bugs or refine the meaning of a particular construct. If the container 220 determines that the CCF version being run by the component 240 is not supported by its own CCF implementation, the container 220 may simply decline the handshaking request by returning a null value to the component 240.

When possible, new versions of the CCF interface may be designed to be backwards compatible with previous versions. To better enable backward and future compatibility in new versions of the CCF container and component interfaces, functions may be designed to ignore any unexpected or unrecognized input, as such input is likely the result of communication with a more a recent version of the CCF interface.

Returning to FIG. 3, upon successful completion of the handshaking function, the container 220 is ready to receive CCF calls from the component 240. Thus, in step 302, the component 240 invokes functionality on the container 220 by calling a function defined in the CCF container interface. The available CCF function calls are described in greater detail below with reference to FIG. 4.

In step 303, the component 240 sends an "onLoad" event to the container 220. The on Load event, which is described in greater detail below, indicates to the container 220 that the calling component 240 is now ready to receive CCF function calls. Thus, in step 304, the container 220 may call a function defined in the CCF component interface, while continuing to receive and support the container interface functions for calls by the component 240 or another component within the container 220. Then, in step 305, the component 240 sends an "onUnload" event to the container 220, unregistering the component by indicating to the container 220 that the component 240 will no longer accept CCF calls. While onUnload is typically sent by the component 240 during its destruction, the component 240 may persist and subsequently attempt to re-establish communication with the container 220. However, in certain implementations, the component 240 might not be permitted to re-use the container interface pointer obtained in step 301. In such cases, the component 240 may be required to invoke the container's handshaking function (e.g., registerWithCCFContainer) again, before resuming communication with the component 220.

Figure 4:
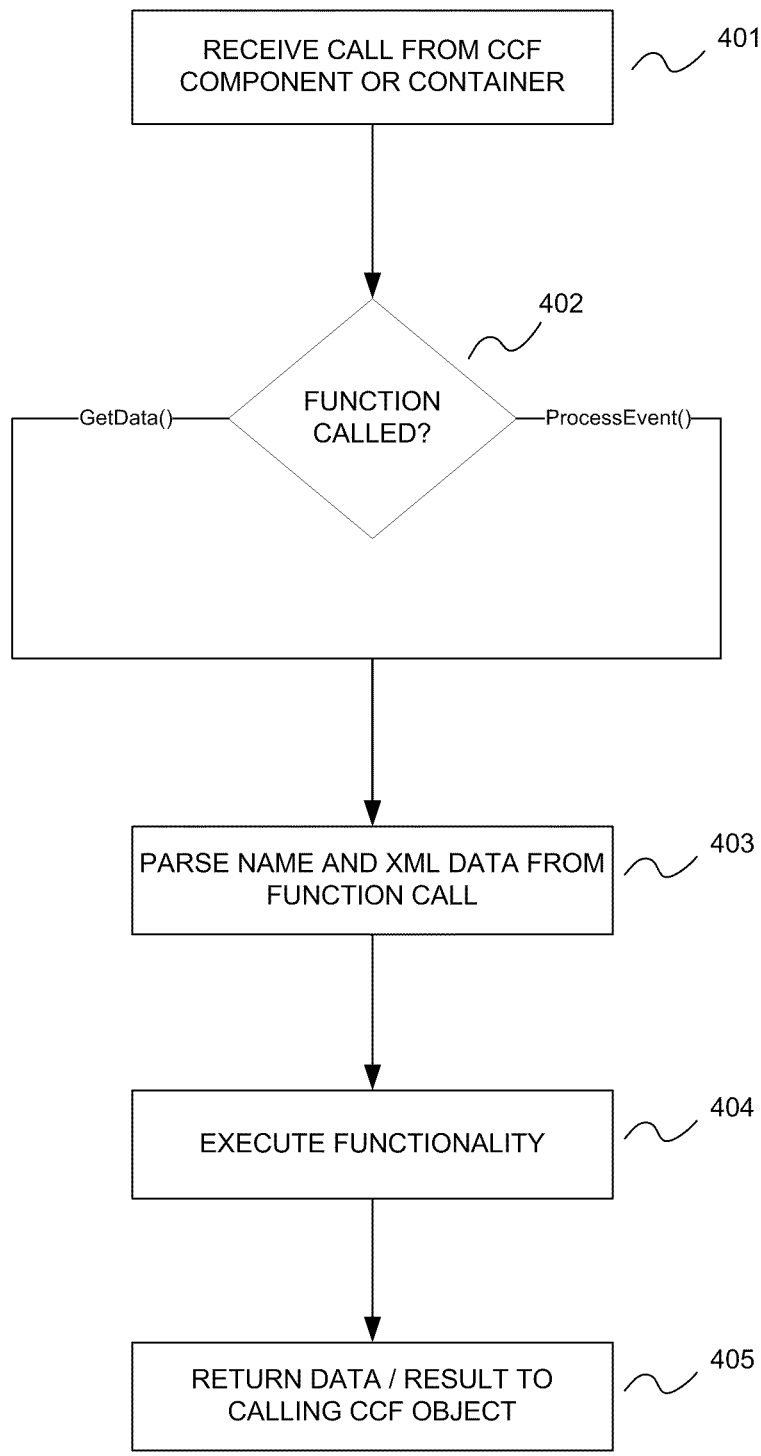
FIG. 4 is a flow diagram illustrating execution of common component framework (CCF) functionality, in accordance with aspects of the present disclosure.

Referring to FIG. 4, a flow diagram is shown illustrating execution of a CCF function. In step 401, a function call is received either at a CCF container 220 or a CCF-enabled component 240. As stated above, the CCF container 220 may support a set of functions, defined in the CCF container interface, different than the functions supported by the component 240, defined in the CCF component interface.

In step 402, the receiver determines which CCF function was invoked by the call. In this example, only two possible CCF functions are supported by both the container 220 and the component 240, the "GetData( )" and the "Process Event( )" functions. Although the container interface and component interface may define the same set of CCF functions, which may even have the same function definition (i.e., the same number and data types of input/output parameters), this does not mean that the actual functionality supported by the component interface is the same as that supported by the container interface. For example, the CCF ProcessEvent( ) function may accept a string input parameter corresponding to an event name, where different sets of events are supported by the container 220 and component 240. A list of events potentially supported by the CCF container interface and CCF component interface is described below. One way of implementing this event and data retrieval functionality for the CCF interfaces is illustrated by the following interface definitions:

```
interface ICCF : IDispatch
{
    [id(1)] HRESULT getData(
        [in] ICCFObj* requestObj,
        [out, retval] BSTR* result);
    [id(2)] HRESULT processEvent(
        [in] ICCFObj* eventObj.
        [out, retval] VARIANT_BOOL* result);
}
interface ICCFObj : IDispatch
{
    [propget.id(1)] HRESULT name(
        [out, retval] BSTR* value);
    [propget.id(2)] HRESULT xmlData(
        [out, retval] BSTR* value);
}
```

In this example, the ICCF object supports either the get-Data or processEvent functions. As is shown in the function definitions, a pointer to an ICCFObj is an input parameter required by both of the ICCF methods. The referenced ICCFObj passed as a parameter contains a 'name' string (e.g., BSTR) corresponding to the event being sent (by the processEvent function) or the data being requested (by the get-Data event). The referenced ICCFObj also contains a 'xml-data' string, to provide additional information in the form of an XML document that may be parsed and used by the container 220 or component 240 to process the event or request.

Many different configurations of events and retrievable data are possible, and some likely event and request names are discussed in detail in the next section. However, it should be noted that in certain configurations, the name identifier in an ICCFObj passed in with a CCF function call can never be a null or empty value. That is, any attempt to request data or send an event without specifying the event name or requested data will result in an error being returned to the caller. In contrast, the xmldata identifier might often be null or an empty value, as many events or data requests may require no additional data for the CCF container 220 or component 240 to successfully process the event or request.

Thus, regardless of the function call, the name and xmldata parameters are parsed by the CCF object receiving the call in step 403, so that the desired event or data request can be processed. In step 404, the requested functionality is executed, and in step 405, the function return values and/or data are sent back to the function caller.

As discussed above in reference to FIGS. 3 and 4, the container 220 and component 240 may interact by sending events and making data requests through their respective CCF interfaces. When those events and/or data requests are made, data may be passed in complex custom data types (e.g., information types) specifically defined by the CCF schema files. The CCF schema files are typically implemented as XML documents (e.g., XML Schema Definition (XSD) files) and downloaded to the computer 100 along with the JavaScript files implementing the CCF container and component functionality. As is commonly known, XSD files are capable of defining information types by in terms of XML elements and attributes, along with constraints upon what data values and types the elements and attributes may store. Like other XML documents, an XSD may be parsed by the receiving software component and used to populate an object instance of the appropriate type.

A sample XSD file defining an information type is included below. In this example, the ContextData information type is fully described by the ContextData.XSD file. The type name is designated by the "name" attribute of the xs:complexType element, and the structure of the type is defined by what is contained within this xs:complexType tag. Thus, in the below example:

```
<xs:complexType name="ContextData">
    ...
</xs:complexType>
```

The ellipsis represents the structure of the ContextData type, which may include sets of simple data types such as numbers or strings, and may also include more complex embedded data types. In the ContextData.XSD file below, it can be seen that the contextdata type includes a sequence of entity objects (denoted by the <xs:element ref="Entity"> tag within the <xs:sequence maxOccurs="unbounded"> tag), and an optional string attribute named searchID (denoted by the <xs:attribute name="searchID" type="xs:string" use="optional"> tag). Further down in the ContextData.XSD file, the entity object type is defined in a similar way. Thus, a software component receiving XML data from a sender can parse the XML to determine that it represents an object of type "contextdata," then access the ContextData.XSD file to validate the received data, construct an contextdata software object, and populate the object with the values parsed from the XML file.

In many of the possible CCF events and data requests described herein, an instance of the "ContextData" data type is the most frequently passed information between CCF containers and components. In its simplest form, the ContextData instance may describe a single entity (e.g., a financial entity such as a company, stock, bond, market, country, etc.) by storing one or more identifiers of that entity (e.g., RIC, CUSIP, ISIN, etc.). In other cases, an instance of ContextData may hold more complex data to represent fields (i.e., name-value pairs) and/or sub-entities objects that are associated with the primary entity. A ContextData instance might also consist of a list of entities, stored either as a flat list or as a hierarchical tree structure of entities.

While a component 240 is running within a container 220, the component 240 typically has a primary context which may be set based on the focus of the data that is being presented within the user interface of the component 240. When a user of the component 240 sets a new focus, for example, by clicking on a different entity item in the component UI, the components 240 should update its primary context accordingly, thus allowing the container 220 to obtain the current context and synchronize displays/activities with other components. Besides simply maintaining its own primary context, a component 240 may output to the container 220 additional contexts in the form of user mouse-clicks, double-clicks, drags, or right-clicks for context menu selection. These additional contexts may be used by the container 220 to provide input to other components.

ContextData.XSD

```
<?xml version="1.0" encoding="UTF-8" ?>
<!-- edited by -->
<xs:schemaxmlns:xs="http://www.w3.org/2001/XMLSchema" xmlns="http://www.namespaceserver.com/ccf"
    targetNamespace="http://www.namespaceserver.com/ccf" elementFormDefault="qualified"
    version="2.0">
    <xs:annotation>
        <xs:documentation>
            <p>This document defines schema for the XML instance that is created by the
component/s to notify the container and the container to notify the components to indicate a context change
request. </p>
        </xs:documentation>
    </xs:annotation>
    <xs:element name="Entities" type="ContextData" />
    <xs:complexType name="ContextData">
        <xs:sequence maxOccurs="unbounded">
            <xs:element ref="Entity" />
        </xs:sequence>
        <xs:attribute name="searchID" type="xs:string" use="optional">
            <xs:annotation>
                <xs:documentation>
                    <p>This attribute is only used in conjunction with asynchronous
component initiated search (that requested with a getData("search", <SearchTarget>)).</p>
                    <p>If the container chooses to return the search results
asynchronously, it will return an "Entities" element with this attribute filled with a unique identifier, and will
return NO "Entity" elements. When the search is complete, it will return (in the "onSearchResults" event) an
"Entities" element with the SAME identifier, and will include all of the "Entity" elements representing the result
of the search.</p>
                </xs:documentation>
            </xs:annotation>
        </xs:attribute>
    </xs:complexType>
    <xs:element name="Entity">
        <xs:annotation>
            <xs:documentation>
                <p>This element represents a business entity such as a business sector,
company/issuer, Instrument, Quote, etc. </p>
            </xs:documentation>
        </xs:annotation>
        <xs:complexType>
            <xs:sequence>
                <xs:element ref="Identifier" minOccurs="0" maxOccurs="unbounded" />
                <xs:element ref="Field" minOccurs="0" maxOccurs="unbounded" />
                <xs:element ref="Entity" minOccurs="0" maxOccurs="unbounded" />
            </xs:sequence>
            <xs:attribute name="type" type="xs:string" />
            <xs:attribute name="datasource" type="xs:string" use="optional" />
        </xs:complexType>
    </xs:element>
    <xs:element name="Field">
        <xs:annotation>
            <xs:documentation>
                <p>This element represents a field name/value pair and associated
datsource if any such as IDN, NDA, EJV</p>
            </xs:documentation>
        </xs:annotation>
        <xs:complexType mixed="true">
            <xs:attribute name="name" type="xs:string" use="required" />
            <xs:attribute name="datasource" type="xs:string" use="optional" />
        </xs:complexType>
```

-continued

ContextData.XSD

```
    </xs:element>
    <xs:element name="Identifier">
        <xs:annotation>
            <xs:documentation>
                <p>This element represents securities symbology namespace: RIC, SEDOL, EJV, ISIN, etc.</p>
            </xs:documentation>
        </xs:annotation>
        <xs:complexType mixed="true">
            <xs:attribute name="namespace" type="xs:string" use="required" />
        </xs:complexType>
    </xs:element>
</xs:schema>
```

Several additional examples of information types compatible with container-component CCF communication are disclosed as XSD files and described in the Appendix below.

As discussed above, once the container 220 and component 240 have exchanged CCF interface pointers, they can interact through their respective interfaces. This interaction may take the form of events and requests sent from one to the other, as illustrated above in FIG. 4. The following section provides information about certain events and data requests that may be included in the CCF interfaces. While the same set of events and data requests may be implemented in both directions (i.e., in both the container interface and the component interface), there may be other events and/or data requests that are implemented only in one direction. For example, component-to-container events may be sent as an indication of the current state of a component 240 to its container 220, when no corresponding container-to-component event is supported. Many of the component-to-container events below are triggered by some user action in the component.

Examples of Component to Container Events 1. onLoad—In this example, the onLoad event is the first event sent to the container 220 after the handshaking function. This event indicates that the component 240 is now initialized and is ready to accept events and requests from the container 220. This data sent with this event is the description of the component 240, sent to the container 220 as an XML document.

2. onUnload—The onUnload event is the last event sent to the container 220 from an instance of a component 240. No data is sent with this event. After the processEvent function call returns for this event, the component 240 no longer accepts events and requests from the container 220. However, the container 220 may send requests and/or events to the component 240 while this event is processing.

3. onClick—The onClick event notifies the container 220 of a user mouse click action taking place on the user interface of the component 240. This event is a mechanism for the component 240 to provide data linking to another component (i.e., the output of component 240 is used as input for another component), if the container 240 wishes to use this data for data linking. The data for this event describes the entity within the component (e.g., user interface control button, dropdown menu, etc.) that the user clicked on, and may take the form of a ContextData instance as defined above in the ContextData.XSD file.

4. onDoubleClick—The onDoubleClick event is similar to the onClick event, but notifies the container 220 have a user double-click on the user interface of the component 240.

5. onContextDragStart—The onContextDragStart event notifies the container 220 that the user is attempting to drag some entity displayed in the component 240. Like the onClick event, the data for this event may also be a ContextData data structure describing the entity that the user is dragging (e.g., describing the entity context). Similarly to the onClick event, this event may be used to supply the data output from the component 240 into another component.

6. onComponentDragStart—The onComponentDragStart event is sent by the component 240 to notify the container 220 that the user is attempting to drag an entire component. This component may be the component 240, or it may be another component (e.g., a sub-display of component 240). Certain components may support dragging, for example, by displaying a drag "handle" for the user to click-and-drag on the user interface. This event provides a data structure describing the current state of the component, and can be used by the container 220 to clone the component 240 at another location in the container 220.

7. onContextMenu—The onContextMenu event notifies the container 220 that the user has right-clicked within the component 240. After receiving this event, the container 220 may respond by displaying its context on the component 240 user interface. This event may provide data such as the screen relative coordinates of the location of the right-click, as well as a information indicating menu options that the component 240 wishes to be added to the context menu. Additionally, if the user right-click was on a user interface entity, data describing that entity may be sent with the event.

8. onUpdateCommandBars—The onUpdateCommandBars event may be sent in response to a user action. The event data describes the context menu, the toolbar, and/or the service menu. Using this event, the component 240 may customize these menus or the toolbar while the component 240 is running. For example, the component 240 may provide new values in the onUpdateCommandBars event to replace the values that were specified in the onContextMenu event.

9. onContextChange—The onContextChange event notifies the container 220 that the component 240 has recently changed its primary focus. The event data describes the new context.

10. onProperyChange—The onPropertyChange event notifies the container 220 that the value of one or more of its properties have changed. The data for this event describes the properties that have changed and may include the new values.

11. onPopup—The onPopup event is sent by the container 220 to a component when the container 220 wishes to have a CCF-enabled popup window created on the user interface of the component 240. The data sent by the container 220 with the event may correspond to the preferred size and location of the popup window. The data may also contain a description of the CCF component 240 to be loaded in the popup window.

12. onLog—The onLog event is sent by the component 240 to request that an entry in the container's 220 log file, if it has one. The component 240 may use this event to record the significant happenings of the component (e.g., error occurrences, user transactions, etc.). The event data contains the text of the message to be logged and a severity (e.g., critical, high, warning, information, debug, etc.). Certain logged messages may be localized for additional user convenience if they are to be read by the user, for example, for debugging errors in a CCF component 240.

Examples of Component to Container Data Requests 1. persistdata—The persistdata data request may be used, for example, when a container 220 is creating the component 240 from a saved copy, a component drop, component paste, or in response to onPopup event. No data is sent by the component 240 with this data request. The return value of this request may include all the state information of a component 240 needed so the component can restore its state. For example, a component 240 may make this request after a successful handshaking function call, but before sending the onLoad. The container 220 may keep a copy of this state data throughout the lifetime of the component 240.

2. search—The component 240 may send a search data request to have the container 220 perform a search on behalf of the component 240. The data provided with this request describes the search to be made.

Examples of Container to Component Events

The following are examples of events that a container 220 may send to a component 240, between the onLoad and onUnload events described above.

1. onContextChange—The onContextChange event provides an instance of a component 240 with a context sent by the its container 220. If the context data passed in with the event does not match the current existing context information of the component 240, then this event may act as a request on the component 240 to change its context accordingly. The event may originate with another CCF-enabled component, and may be conveyed through the container 220 to the intended component 240 without needing to be converted by the container 220. In other onContextChange event calls, the container 220 may need to convert the context before sending it the component 240, or it may construct a context with an identifier of type unknown and still pass the identifier to the component 240 to interpret it.

2. onProperyChange—The onPropertyChange event allows the container 220 to change one or more property values of the component 240. Data corresponding to the properties to be changed may be sent with this event. The component 240 may be configured to ignore attempts by the container 220 to change read-only properties or non-existent properties for the component 240.

3. onCommand—The onCommand event is sent by the container 220 to inform the component 240 that the user has made a choice from a menu or toolbar (e.g., the Reuters Toolbar, the Service Menu, or the context menu). The data provided with this event describes the user choice.

Examples of Container to Component Data Requests 1. context—The container 220 may use the context data request to retrieve the current context of a component 240. No data is supplied with this data request. The container 220 may use this information during a component startup in order to synchronize the component 240 with other components that the container 220 may be concurrently displaying.

2. description—The description data request returns the description of the component 240 to the container 220. This may be the same description that was passed in with the onLoad event sent by the component 240. Thus, if the container 220 has not cached this value, it can obtain it with this data request.

3. persistdata—The persistdata data request allows the container 220 to retrieve a copy of the current state of a component 240. The persistdata data request may be used when the user wishes to save the component 240.

4. properties—The properties data request is sent by the container 220 to retrieve the current values of all the properties of a component 240.

5. helpurl—The helpurl data request returns a copy of a help universal resource locator (URL) provided for the convenience of the container 220, in implementing container-level user help functionality.

6. inputowner—The inputowner data request returns either the string "component" or "container," and is used by the container 220 to control user input. The value will be set to "component" whenever the input focus is on a user interface control within the component 240, and will be "container" at all other times. The container 220 can use this value to determine whether to handle user input (e.g., keyboard and menu input) itself, or whether to pass the user input along to be handled by the component 240.

It should be noted that the above-described CCF functionality for both containers and components may be implemented as a client side framework written in a scripting language, for example, Netscape JavaScript, that can be embedded into a web page and executed by a browser 230. In such an implementation, a CCF JavaScript file may be required to be included with each component. However, component creators may also potentially implement the JavaScript event forwarding and application program interface (API) using other technologies, for example, Microsoft Visual Basic. Additionally, component creators may implement their own interface in JavaScript.

Figure 5:
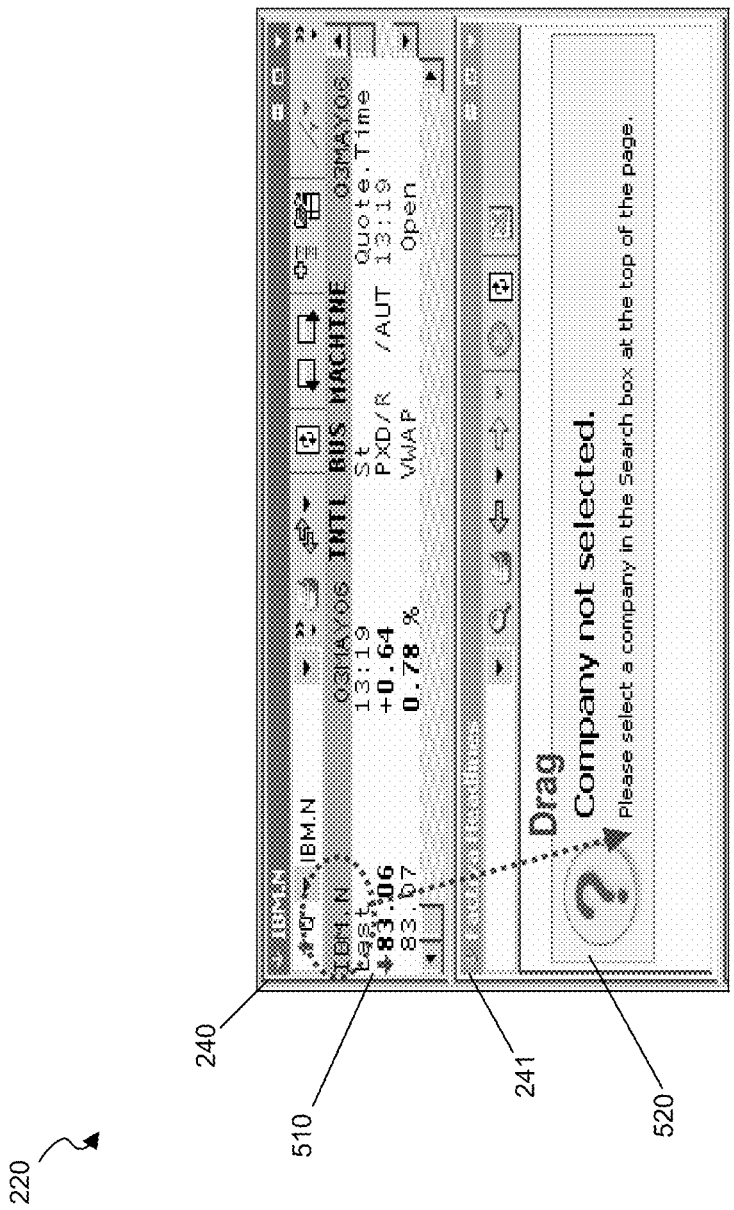
FIGS. 5-9 are illustrative screen shots demonstrating user interaction with CCF-enabled components within CCF containers, in accordance with aspects of the present disclosure.
Figure 6:
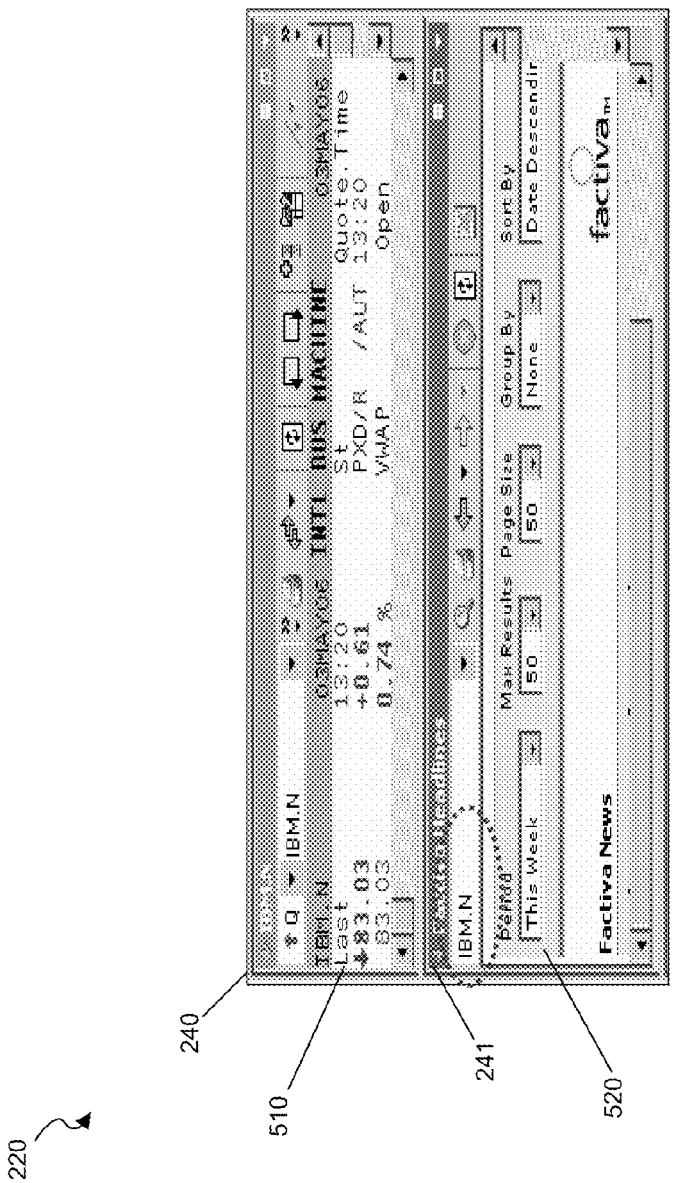

Referring now to FIGS. 5 and 6, an example is shown illustrating user functionality that may be supported using the above-described CCF-enabled functions for component-container communication.

In FIG. 5, a CCF-enabled stock-tracker component 240 is displayed in the component user interface display pane 510. At the same time, another component 241, configured to display news headlines, is running within the same container 220 and displayed on the browser adjacent to component 240. In this example, container 220 is an instance of a Reuter's 3000Xtra container application, and the stock tracker component 240 is a 3000Xtra quote object. As shown in FIG. 5, the display pane 520 of component 241 is empty, since no target company has been selected for displaying news. In other words, component 241 is running but does not have a current context. Also shown in FIG. 5, the current context for the stock tracker component 240 is "IBM.N", corresponding to the IBM Corporation.

In this example, the stock tracker component 240 is a CCF-enabled component which supports dragging and dropping of a context using the onContextDragStart event described above. Thus, the user may click and drag the highlighted "IBM.N" line in the display pane 510 out of the current component 240 and into the display pane 520 of the adjacent component 241, as indicated in FIG. 5. When the user drags an entity within the component 240, the entity being dragged may be sent as output to the container 220, so that the container 220 can store the context and use the context when the entity is dropped.

When the user drops the entity on a different CCF-enabled component 241, the new context is passed from the container 220 to the target component 241. In response, the component 241 will take the necessary (often component-specific) actions to change its primary context to match the new context provided by the container 220. If the new context originates with another CCF-enabled component, as is this example, the event will typically pass the context unchanged. However, if the new context comes from another source, such as a non-CCF-enabled component, then the container 220 may attempt to convert the input into an appropriate context. The container 220 may attempt to convert the provided input into context data on its own (e.g., using search functionality), or may simply pass a context from the non-CCF-enabled component with an identifier of type unknown to the target component, in the hopes the target component understands the context.

In this example, since both the source component 240 and target component 241 are CCF-enabled, the context passing process may be considerably easier. The target component 241 may have described to the container 220 the type of context data it can accept, for example, using the description data passed with the onLoad event. If so, container 220 may coordinate with component 240 to obtain the correct type of context for the target component 241. Additionally, if needed, the container 220 may convert the context into a form and data type acceptable to the target component 241.

Referring now to FIG. 6, the new context has been passed to the news headline component 241, and component-specific functionality has been invoked in response to the new context to update the display pane 520 to show news events related to IBM.

Figure 7:
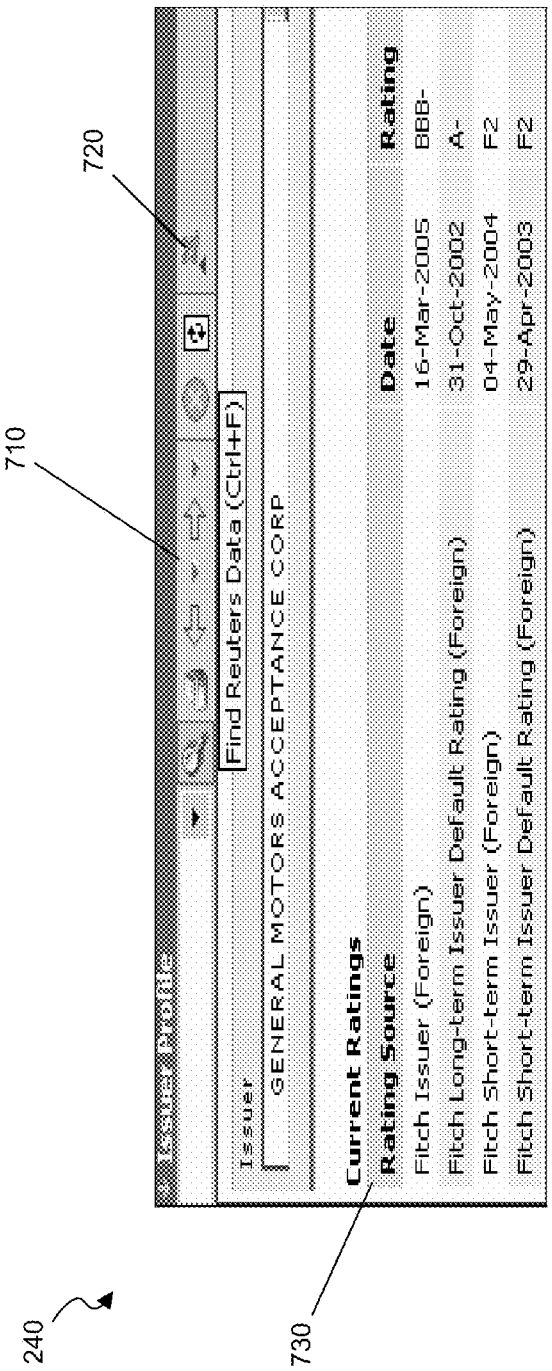
Figure 8:
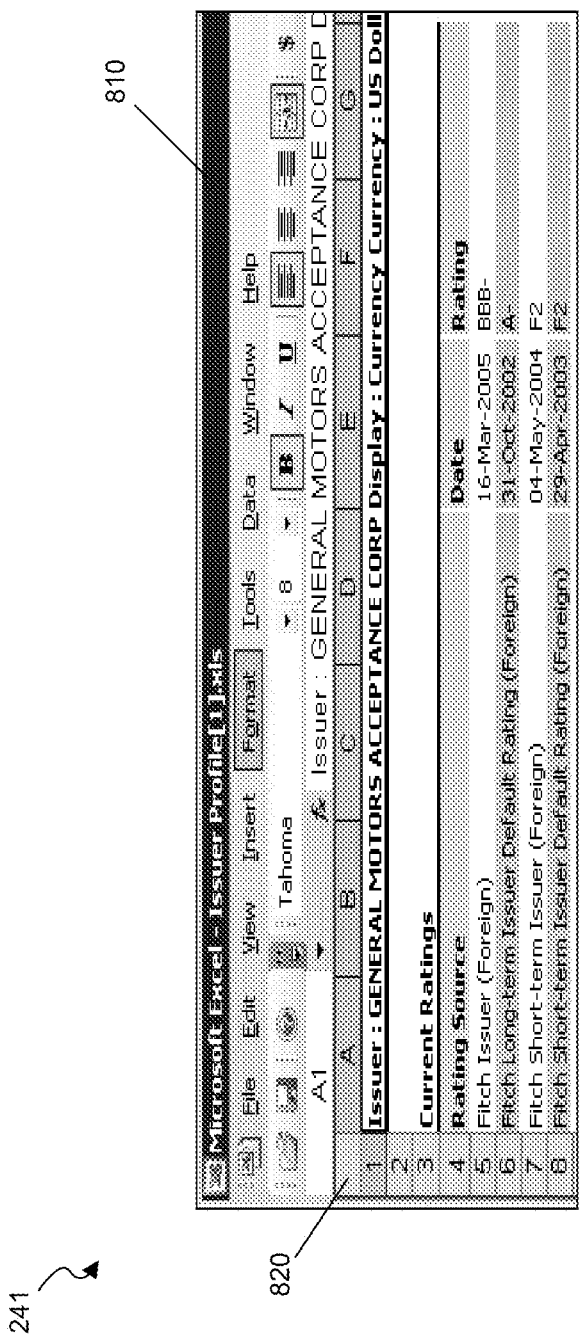

Referring now to FIGS. 7 and 8, another example is shown illustrating user functionality that may be supported using CCF-enabled components and containers. In FIG. 7, a CCF-enabled component 240 has been implemented to display ratings data associated with a user-selected issuer. When a user inputs or selects an issuer name (e.g., General Motors) from the drop-down user interface control within the component 240, the component 240 retrieves the associated rating data and displays it in display pane 730. This basic functionality of component 240 may be entirely internal to the component 240 and may occur without any interaction with the container 220. However, in addition to the basic functionality and user interface controls implemented by the component 240, a standard toolbar 710 customized with a Microsoft Excel icon 720 are also incorporated into the component 240. The Excel icon 720 indicates that the CCF-enabled component 240 supports exporting of data from the component 240 display pane 730 into an Excel spreadsheet. In this example, the component 240 may have indicated to the container 220 that an Excel icon 720 is to be displayed on the toolbar 710, by passing this information (and possibly even the icon 720 itself) in the description sent to the container 220 with the onLoad event.

When the user clicks the icon 720 with ratings data in the display pane 730, a new Microsoft Excel Application window 241 is instantiated and displayed to the user, as shown in FIG. 8. In this example, after detecting the user click, the container 220 may send an onCommand event to the component 240 indicating that the Excel icon 720 was clicked. After receiving this event, the component 240 may send a request to a remote data server to retrieve an Excel worksheet corresponding to the ratings data in the display pane 730, and then may start an instance of Excel with the worksheet in a new pop-up window 241 using existing IE functionality. Thus, in this example, the container 220 simply provides a notification to the component 240 of selection of a toolbar item or menu option, then allows the component to handle the selection without any further container-component communication. Of course, in other component-container implementations, communication between the two may continue to support different techniques for data retrieval, presentation, etc. For example, using CCF communication, a container-component may coordinate the creation of a new component inside the container, and populate the new component with the data retrieved from the remote server, or with data directly in the component display pane 730.

Additionally, a container 220 may create a new component and set up direct component-to-component communication between them. For example, a component may pass arbitrary data to another component running within the same container as part of persistData sent with an onPopup or onComponentDragStart event. In other implementations, one component may contain another component and the two may mutually agree to extend the CCF interfaces to provide events for their own private data format.

In addition to the export to Excel functionality illustrated by FIGS. 7-8, CCF-enabled components and containers are capable of supporting several different user interaction features. A table listing some of these potential features is included below:

| Functionality | Primary Function Implemented by |
|---|---|
| Container led search | Container |
| Print | Container |
| General Functions | Component |
| Export to Excel | Component |
| Save and Load | Container |
| Component Drag and Drop | Container |
| Context Drag and Drop | Container |
| Properties | Component |
| Linking of Components | Container |
| Pop Ups | Container |
| Component Copy and Paste | Container |
| Container Description | Container |
| Component Initiated Search | Container |
| Field level Drag and Drop | Container |

Figure 9:
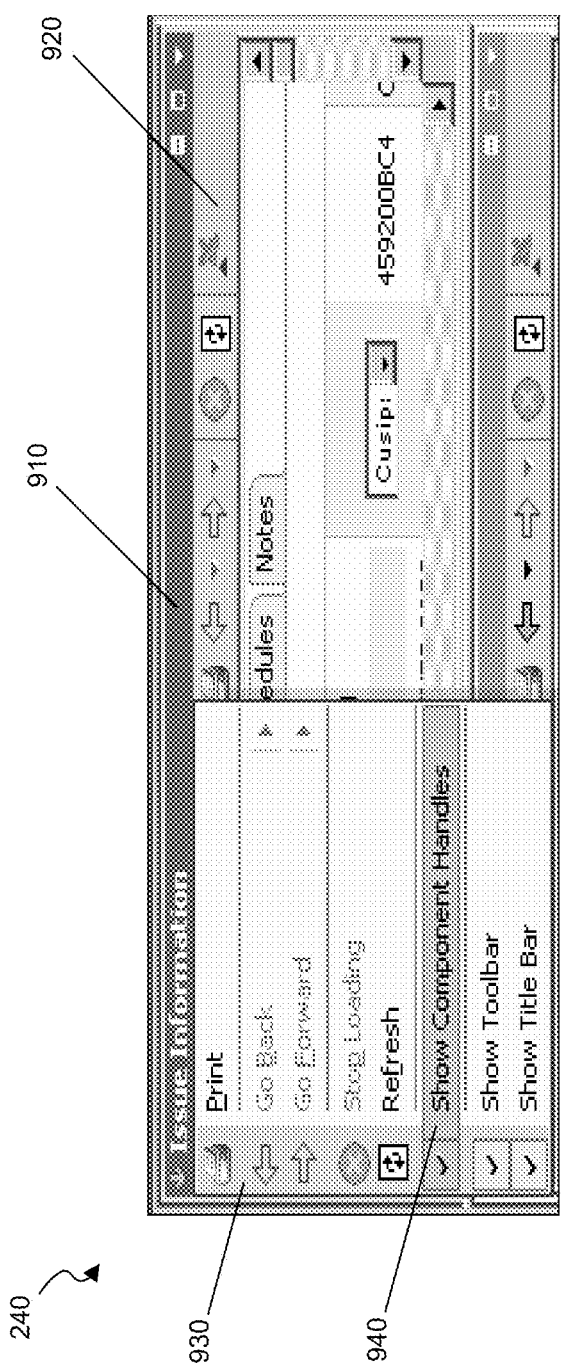

Referring now to FIG. 9, another variation of user interaction with a CCF-enabled component 240 running within a CCF container 220 is shown, relating to maintaining and communicating property values. As described above, a component 240 may provide property information to its container 220, and vice versa, allowing the container 220 to customize the title bar 910, toolbars 920, and menus 930, based on the user functionality supported by the component 240. Of course, the property names, values, types, and access permissions of the properties supported by the component 240 may depend on the specific component 240. However, in certain embodiments, the component 240 may be required to maintain a predefined minimum set of properties. In FIG. 9, for example, the component 240 is running within a Reuter's 3000Xtra container 220, and is required to expose at least three properties to the container 220. First, the "Title" property is a read-only (i.e., can only be set by the component 240 itself) string value that the container 220 uses to set the label in the title bar 910. In this example, the component 240 has set a Title of "Issue Information", allowing the container 220 to retrieve that value and update the title bar 910 accordingly. The second property, "HelpURL", is another read-only property set by the component 240 and retrieved by the container 220. If the HelpURL property has a non-NULL value, then the container 220 can provide a link to the provided URL, (e.g., as a help button on the toolbar 920 or a help menu item) that will redirect the user to the help content provided for the component 240. Thus component-specific user help can be provided within the menus and toolbars of the container 220. The third required property in this example is the boolean "SelectorVisible" property. The SelectorVisible property is set by the container 220 in response to the user selection of the Show Component Handles item 940 in the container menu 930. When this property is set to TRUE, the component 240 will expose its handles, allowing a user to select and drag the component 240 within the container 220, if the component 240 is available for dragging. Thus, certain properties may be set by either the container 220, component 240, or both, to provide component-specific support within the framework of the container 220, providing the user with a more seamless and coherent experience.

In one arrangement, a method is supported for electronic communication between a component software object and a software container object, similar to the techniques described above in reference to FIGS. 3 and 4. The method may include initiating a registration function on the container object 220, passing into the function a first interface pointer corresponding to a generic component interface supported by a component object 240 within the container object 220. The method further includes receiving from the container 220 a second interface pointer corresponding to a generic container interface supported by the container 240, wherein the first and the second interface support a predetermined set of functions for generic communication between a component 240 and a container 220. The method also includes receiving user input on a user interface control running within the component 240, determining a function supported by the container interface associated with the received user input, and invoking the function in the container interface using the second interface pointer. In certain embodiments, the container 220 and the first component 240 may execute within an instance of a browser application 230. Additionally, the method may include receiving a component context data, including an entity identifier, from the container 220 via the second interface. The entity identifier may be associated with a financial entity, such as a company, a stock, a bond, a market, or a country. Additionally, the method may include retrieving data from a remote data store based on the component context data in response to receiving the component context data from the container 220, executing component-specific functionality using the retrieved data, and updating a user interface of the component 240 based on the executed component-specific functionality.

In another arrangement, a second method is provided for electronic communication between multiple component software objects 240 and 241, and a container software object 220, similar to the techniques described above in reference to FIG. 5. The second method includes transmitting a first interface pointer from a container 220 to a first component 240, the first interface pointer defining a plurality of functions supported by the container 220 with respect to the first component 240, and receiving at the container 220 a second interface pointer from a second component object, the second interface pointer defining a plurality of functions supported by the second component 241 with respect to the container 220. The method may further include receiving an indication, including component context data, via the first interface that a first user action has occurred within the first component 240, detecting a second user action associated with the second component 241, and transmitting via the second interface the component context data to the second component 241.

The second method may also include determining whether the component context data is compatible with the second component 241, and if the component context data is not compatible with the second component, converting the component context data based on stored information describing the second component 241. In certain embodiments, the first user action may correspond to selection of an entity from a user interface within the first component 240, such as a company, stock, bond, market, or a country. The first user action may also correspond to a drag event associated with an entity in a user interface within the first component 240, or a drop event associated with the entity, the drop event occurring within the second component 241 on the user interface. Additionally, the first user action may designate one or more data fields within a user interface of the first component 240, and the second user action may correspond to a drop event for the designated data fields into a user interface of the second component 241. The first or second user action may also correspond to a user command exporting selected data fields into a spreadsheet software application. In one embodiment, the container 220 and the first component 240 may execute within an instance of a browser application 230.

Various aspects of the methods, models and architectures described herein may be stored in a computer readable medium in the form of computer readable instructions. Types of computer readable media may include magnetic tape drives, optical storage, flash drives, random access memories (RAM), read only memories (ROM) and the like. In addition, aspects of the methods, models and architectures described herein may also be used with other industries and applications.

The present invention has been described in terms of preferred and exemplary embodiments thereof. Numerous other embodiments, modifications and variations within the scope and spirit of the appended claims will occur to persons of ordinary skill in the art from a review of this disclosure.

APPENDIX

The ContextData information type was described in detail above and defined in the ContextData.XSD schema file previous disclosed. However, container-component communication using CCF interfaces and other aspects disclosed herein is not limited to passing ContextData between a container and a component. Many other information types may be communicated, and a few examples of such types are described now and disclosed as XSD files in this Appendix. For example, the Properties.XSD file below defines a schema for the "Properties" information type, corresponding to an XML instance created and sent by the component 240 to the container 220 in response to a container 220 request for properties.

| Properties.XSD |
|---|

```
<?xml version="1.0" encoding="UTF-8"?>
<!-- edited by -->
<xs:schemaxmlns:xs="http://www.w3.org/2001/XMLSchema" xmlns="http://www.namespaceserver.com/ccf"
    targetNamespace="http://www.namespaceserver.com/ccf" elementFormDefault="qualified"
    version="2.0">
```

| Properties.XSD |
| --- |

```xml
<xs:annotation>
    <xs:documentation>
        <p>This document defines schema for the XML instance that is created by the component/s when properties are requested by the container</p>
    </xs:documentation>
</xs:annotation>
<xs:element name="Properties">
    <xs:complexType>
        <xs:choice>
            <xs:element name="Property" minOccurs="0" maxOccurs="unbounded">
                <xs:annotation>
                    <xs:documentation>Binds a value to a name. Also provides additional type and access control information.</xs:documentation>
                </xs:annotation>
                <xs:complexType mixed="true">
                    <xs:attribute name="name" type="xs:string" use="required">
                        <xs:annotation>
                            <xs:documentation>Specifies the property name.</xs:documentation>
                        </xs:annotation>
                    </xs:attribute>
                    <xs:attribute name="type" type="xs:string" default="xs:string">
                        <xs:annotation>
                            <xs:documentation>Underlying property type, can be either a xs:xxx value or a custom enumerated type (see EnumeratedType element).</xs:documentation>
                        </xs:annotation>
                    </xs:attribute>
                    <xs:attribute name="access" type="AccessType" default="rw">
                        <xs:annotation>
                            <xs:documentation>Specifies whether the property is read-only (ro) or read-write (rw)</xs:documentation>
                        </xs:annotation>
                    </xs:attribute>
                </xs:complexType>
            </xs:element>
            <xs:element name="EnumeratedType" minOccurs="0" maxOccurs="unbounded">
                <xs:annotation>
                    <xs:documentation>Defines an enumerated type. Allow the container to display a list of meaningfull values.</xs:documentation>
                </xs:annotation>
                <xs:complexType>
                    <xs:sequence maxOccurs="unbounded">
                        <xs:element name="Item">
                            <xs:complexType>
                                <xs:attribute name="value" type="xs:string">
                                    <xs:annotation>
                                        <xs:documentation>Actual item value</xs:documentation>
                                    </xs:annotation>
                                </xs:attribute>
                                <xs:attribute name="caption" type="xs:string">
                                    <xs:annotation>
                                        <xs:documentation>Localized name of the item</xs:documentation>
                                    </xs:annotation>
                                </xs:attribute>
                            </xs:complexType>
                        </xs:element>
                    </xs:sequence>
                    <xs:attribute name="name">
                        <xs:annotation>
                            <xs:documentation>Type name, to be used as a type reference in Property/@type attribute</xs:documentation>
                        </xs:annotation>
                    </xs:attribute>
                </xs:complexType>
            </xs:element>
        </xs:choice>
    </xs:complexType>
</xs:element>
<xs:simpleType name="AccessType">
    <xs:annotation>
        <xs:documentation>Access control definitions.</xs:documentation>
```

-continued

Properties.XSD

```
        </xs:annotation>
        <xs:restriction base="xs:string">
            <xs:enumeration value="ro"/>
            <xs:enumeration value="rw"/>
        </xs:restriction>
    </xs:simpleType>
</xs:schema>
```

The SearchTarget.XSD file below defines the "SearchTarget" information type used for supplying arguments to a search engine and a transform to be applied to the search results. The SearchTarget data assists the container 220, which supports at least one of the search engines specified, in searching for input for the component 220.

SearchTarget.XSD

```
<?xml version="1.0" encoding="UTF-8" ?>
<!-- edited by -->
<xs:schemaxmlns:xs="http://www.w3.org/2001/XMLSchema" xmlns="http://www.namespaceserver.com/ccf"
    targetNamespace="http://www.namespaceserver.com/ccf" elementFormDefault="qualified"
    version="2.0">
    <xs:element name="SearchTarget">
        <xs:annotation>
            <xs:documentation>Comment describing your root element</xs:documentation>
        </xs:annotation>
        <xs:complexType>
            <xs:sequence minOccurs="0" maxOccurs="unbounded">
                <xs:element name="Constraint">
                    <xs:annotation>
                        <xs:documentation>Define the search constraint for a
given search engine.</xs:documentation>
                    </xs:annotation>
                    <xs:complexType mixed="false">
                        <xs:sequence>
                            <xs:element name="Definition" maxOccurs="unbounded">
                                <xs:annotation>
                                    <xs:documentation>An actual
search engine constraint document.</xs:documentation>
                                </xs:annotation>
                                <xs:complexType>
                                    <xs:simpleContent>
                                        <xs:extension base="xs:string">
                                            <xs:attribute name="name" type="xs:string" use="optional" />
                                        </xs:extension>
                                    </xs:simpleContent>
                                </xs:complexType>
                            </xs:element>
                            <xs:element name="ContextDataTransformation" minOccurs="0">
                                <xs:annotation>
                                    <xs:documentation>Provides a
XSLT transformation from the search result to a CCF context data document.</xs:documentation>
                                </xs:annotation>
                                <xs:complexType>
                                    <xs:sequence minOccurs="0">
                                        <xs:any processContents="skip" />
                                    </xs:sequence>
                                </xs:complexType>
                            </xs:element>
                        </xs:sequence>
                        <xs:attribute name="namespace" use="required">
                            <xs:annotation>
                                <xs:documentation>Seach engine
name</xs:documentation>
                            </xs:annotation>
                        </xs:attribute>
                    </xs:complexType>
                </xs:element>
            </xs:sequence>
            <xs:attribute name="multipleMatches" type="xs:boolean" use="optional" />
            <xs:attribute name="contextResolution" type="xs:boolean" use="optional" />
```

SearchTarget.XSD

```
        </xs:complexType>
    </xs:element>
</xs:schema>
```

The Description.XSD file below defines a schema for the XML instance created by the container 220 to allow containers 220 to access the functionality supported by the component 240.

Description.XSD

```
<?xml version="1.0" encoding="UTF-8" ?>
<!-- edited by -->
<xs:schemaxmlns:xs="http://www.w3.org/2001/XMLSchema" xmlns="http://www.namespaceserver.com/ccf"
    targetNamespace="http://www.namespaceserver.com/ccf" elementFormDefault="qualified"
    version="2.0">
    <xs:annotation>
        <xs:documentation>
            <p>This document defines schema for the XML instance that is created by the
component/s to allow containers to query capabilities supported by the component</p>
        </xs:documentation>
    </xs:annotation>
    <xs:include schemaLocation="CommandBar.xsd" />
    <xs:include schemaLocation="ContextData.xsd" />
    <xs:include schemaLocation="Properties.xsd" />
    <xs:include schemaLocation="SearchTarget.xsd" />
    <xs:element name="Description">
        <xs:complexType>
            <xs:all>
                <!-- Summary -->
                <xs:element name="Summary" minOccurs="0">
                    <xs:annotation>
                        <xs:documentation>The Summary element serves as a
container for the component's discriptive text</xs:documentation>
                    </xs:annotation>
                    <xs:simpleType>
                        <xs:restriction base="xs:string" />
                    </xs:simpleType>
                </xs:element>
                <!-- Toolbar -->
                <xs:element name="Toolbar" type="CommandBars" minOccurs="0">
                    <xs:annotation>
                        <xs:documentation>The Toolbar element serves as a
container for a collection of controls for the component</xs:documentation>
                    </xs:annotation>
                </xs:element>
                <!--Service Menu -->
                <xs:element name="ServiceMenu" type="CommandBars" minOccurs="0">
                    <xs:annotation>
                        <xs:documentation>This element describes the service
menu for the component</xs:documentation>
                    </xs:annotation>
                </xs:element>
                <!--Component Context Data description-->
                <xs:element name="Context" type="ContextData" minOccurs="0">
                    <xs:annotation>
                        <xs:documentation>This element describes the
symbologies/namespace/fields accepted by the component. This information could be used by containers to
provide contexts to applications like frd search</xs:documentation>
                    </xs:annotation>
                </xs:element>
                <xs:element ref="SearchTarget" minOccurs="0" />
                <xs:element ref="Properties" minOccurs="0" />
            </xs:all>
        </xs:complexType>
    </xs:element>
</xs:schema>
```

Finally, the UpdateCommandBars.XSD file defines a schema for an XML instance created by the component 240, which will be sent to the container 220 when the component 240 needs to update or modify the toolbar, service menu, and/or context menu that is currently being displayed in the container 220. In certain embodiments, a component might only have permissions to modify its own component-specific menu in the container 220.

| UpdateCommandBars.XSD |
|---|
| ```xml
<?xml version="1.0" encoding="UTF-8"?>
<!-- edited by -->
<xs:schemaxmlns:xs="http://www.w3.org/2001/XMLSchema" xmlns="http://www.namespaceserver.com/ccf"
    targetNamespace="http://www.namespaceserver.com/ccf" elementFormDefault="qualified"
    version="2.0">
    <xs:annotation>
        <xs:documentation>
            <p>This document defines schema for the XML instance that is created by the
component when it needs to update/modify the toolbar, service menu and context menu that is currently being
displayed. Only the component specific menu can be modified.</p>
            <p>NOTE: Any "complexType" elements that have not been documented, are used
locally only within the schema for clarity and are not a part of the instance.</p>
            <p>Element naming convention: Root element uses Pascal notation, while all other
elements use Camel notation.</p>
        </xs:documentation>
    </xs:annotation>
    <!--<xs:include schemaLocation="http://schemas.reuters.com/xsd/ccfevents/Menu_2.xsd"/>-->
    <xs:include schemaLocation="CommandBar.xsd"/>
    <!--ELEMENT-->
    <xs:elementname="UpdateCommandBars" type="UpdateCommandBars">
        <xs:annotation>
            <xs:documentation>Specifies the menu(s) (toolbar, context, service...) to be
updated.</xs:documentation>
        </xs:annotation>
    </xs:element>
    <!--END ELEMENT-->
    <!--TYPES-->
    <xs:complexType name="UpdateCommandBars">
        <xs:sequence>
            <xs:element name="Toolbar" type="CommandBars" minOccurs="0"/>
            <xs:element name="ServiceMenu" type="CommandBars" minOccurs="0"/>
            <xs:element name="ContextMenu" type="CommandBars" minOccurs="0"/>
        </xs:sequence>
    </xs:complexType>
    <!--end types-->
    <!--end-->
</xs:schema>
``` |

We claim:

1. A computer-implemented method of electronic communication between a component software object and a software container object, comprising:

initiating, by a first component object within a container object, a registration function on the container object, passing into said registration function a first interface pointer corresponding to a generic component interface supported by the first component object within the container object;

receiving, at the first component object, a second interface pointer from the container object corresponding to a generic container interface supported by the container object;

receiving, at the first component object, user input from a user interface control running within the first component object;

receiving, at the first component object, component context data from the container object, the component context data describing a current state of execution of a second component object executing within the container object;

determining, by the first component object, a function supported by the container object, wherein the function determined is based on (1) the user input received from the user interface control or (2) the current state of execution of the second component;

invoking, by the first component object, the determined function on the container object using the second interface pointer;

retrieving, by the first component object, data from a remote data store based on the component context data of the second component object; and updating a user interface of the first component object using the retrieved data from the remote data store.

2. The method of claim 1, wherein the container object and the first component object execute within an instance of a browser application.

3. The method of claim 1, wherein other than the generic component interface, the first component object does not have an interface to directly invoke the functions of the container object.

4. The method of claim 1, wherein receiving the user input comprises:

receiving an indication that a drag event has occurred within the first component object, the indication comprising data identifying a first data field within the user interface control running within the first component object.

5. A computing device, comprising:

a processor configured to control at least some operations of the computing device; and memory storing computer executable instructions that, when executed by the processor, cause the computing device to:

initiate a registration function on a container object, passing into said registration function a first interface pointer corresponding to a generic component interface supported by a first component object within the container object;

receive at the first component object a second interface pointer from the container object corresponding to a generic container interface supported by the container object;

receive at the first component object user input from a user interface control running within the first component object;

receive at the first component object component context data from the container object, the component context data describing a current state of execution of a second component object executing within the container object;

determine at the first component object a function supported by the container object, wherein the function determined is based on (1) the user input received from the user interface control or (2) the current state of execution of the second component;

invoke the determined function on the container object using the second interface pointer;

retrieve data from a remote data store based on the component context data of the second component object; and update a user interface of the first component object using the retrieved data from the remote data store.

6. The computing device of claim 5, wherein the container object and the first component object are configured to execute within an instance of a browser application.

7. The computing device of claim 5, wherein other than the generic component interface, the first component object does not have an interface to directly invoke the functions of the container object.

8. The computing device of claim 5, wherein receiving the user input comprises:

receiving an indication that a drag event has occurred within the first component object, the indication comprising data identifying a first data field within the first user interface control running within the first component object.

* * * * *